United States Patent
Yoshii

(10) Patent No.: US 12,473,447 B2
(45) Date of Patent: Nov. 18, 2025

(54) INKJET INK AND INKJET RECORDING METHOD

(71) Applicant: KYOCERA Document Solutions Inc., Osaka (JP)

(72) Inventor: Tatsuhiko Yoshii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 535 days.

(21) Appl. No.: 18/048,330

(22) Filed: Oct. 20, 2022

(65) Prior Publication Data

US 2023/0129764 A1  Apr. 27, 2023

(30) Foreign Application Priority Data

Oct. 21, 2021  (JP) ................... 2021-172493

(51) Int. Cl.
| | |
|---|---|
| *C09D 11/326* | (2014.01) |
| *B41M 5/00* | (2006.01) |
| *C09D 11/322* | (2014.01) |
| *C09D 11/38* | (2014.01) |

(52) U.S. Cl.
CPC ......... *C09D 11/326* (2013.01); *B41M 5/0047* (2013.01); *C09D 11/322* (2013.01); *C09D 11/38* (2013.01)

(58) Field of Classification Search
CPC ..... C09D 11/326; C09D 11/322; C09D 11/38; B41M 5/0047
See application file for complete search history.

(56) References Cited

U.S. PATENT DOCUMENTS

| | | | |
|---|---|---|---|
| 2003/0196569 A1* | 10/2003 | Yatake | C09D 11/38 106/31.89 |
| 2017/0253754 A1* | 9/2017 | Kawaharada | C09D 11/14 |
| 2022/0402265 A1* | 12/2022 | Tanaka | C09D 11/322 |

FOREIGN PATENT DOCUMENTS

| | | | |
|---|---|---|---|
| JP | 2020-056018 A | 4/2020 | |
| WO | WO-2010042104 A1 * | 4/2010 | C09D 11/328 |

OTHER PUBLICATIONS

Lin et al. "Effect of using ink containing polyacrylate and silicone surfactant on the inkjet printing of quantum dot films" Journal of Information Display, 21:2, 113-121 Dec. 2019 (Year: 2019).*

* cited by examiner

*Primary Examiner* — Robert S Walters, Jr.
(74) *Attorney, Agent, or Firm* — Studebaker Brackett PLLC

(57) ABSTRACT

An inkjet ink has a volume reduction rate $\Delta V$ calculated using formula (1) "$\Delta V = 100 \times (V_0 - V_{22})/V_0$" of at least 25% and no greater than 45%. In the formula (1), $V_0$ represents a first volume of a liquid droplet of the inkjet ink at landing, on a non-absorbent recording medium, of the inkjet ink dropped onto the non-absorbent recording medium. $V_{22}$ represents a second volume of the liquid droplet when 22 seconds elapse from the landing of the liquid droplet on the non-absorbent recording medium.

10 Claims, 3 Drawing Sheets

INKJET INK AND INKJET RECORDING METHOD

INCORPORATION BY REFERENCE

The present application claims priority under 35 U.S.C. § 119 to Japanese Patent Application No. 2021-172493, filed on Oct. 21, 2021. The contents of this application are incorporated herein by reference in their entirety.

BACKGROUND

The present disclosure relates to an inkjet ink and an inkjet recording method.

Non-absorbent recording mediums that do not absorb water may be used in label printing and package printing. Various inks for forming images on the non-absorbent recording mediums are being studied. For example, a water-based inkjet ink composition is known that contains a pigment, an alkali-soluble resin, a polyolefin resin emulsion, a basic compound, an aqueous medium, and a surfactant.

SUMMARY

An inkjet ink according to an aspect of the present disclosure has a volume reduction rate $\Delta V$ calculated using formula (1) of at least 25% and no greater than 45%.

$$\Delta V = 100 \times (V_0 - V_{22})/V_0 \quad (1)$$

In the formula (1), $V_0$ represents a first volume of a liquid droplet of the inkjet ink at landing, on a non-absorbent recording medium, of the inkjet ink dropped onto the non-absorbent recording medium. $V_{22}$ represents a second volume of the liquid droplet when 22 seconds elapse from the landing of the liquid droplet on the non-absorbent recording medium.

An inkjet recording method according to an aspect of the present disclosure includes ejecting an inkjet ink toward a non-absorbent recording medium. The inkjet ink has a volume reduction rate $\Delta V$ calculated using formula (1) of at least 25% and no greater than 45%.

$$\Delta V = 100 \times (V_0 - V_{22})/V_0 \quad (1)$$

In the formula (1), $V_0$ represents a first volume of a liquid droplet of the inkjet ink at landing, on the non-absorbent recording medium, of the inkjet ink dropped onto the non-absorbent recording medium. $V_{22}$ represents a second volume of the liquid droplet when 22 seconds elapse from the landing of the liquid droplet on the non-absorbent recording medium.

DETAILED DESCRIPTION

Figure 1:
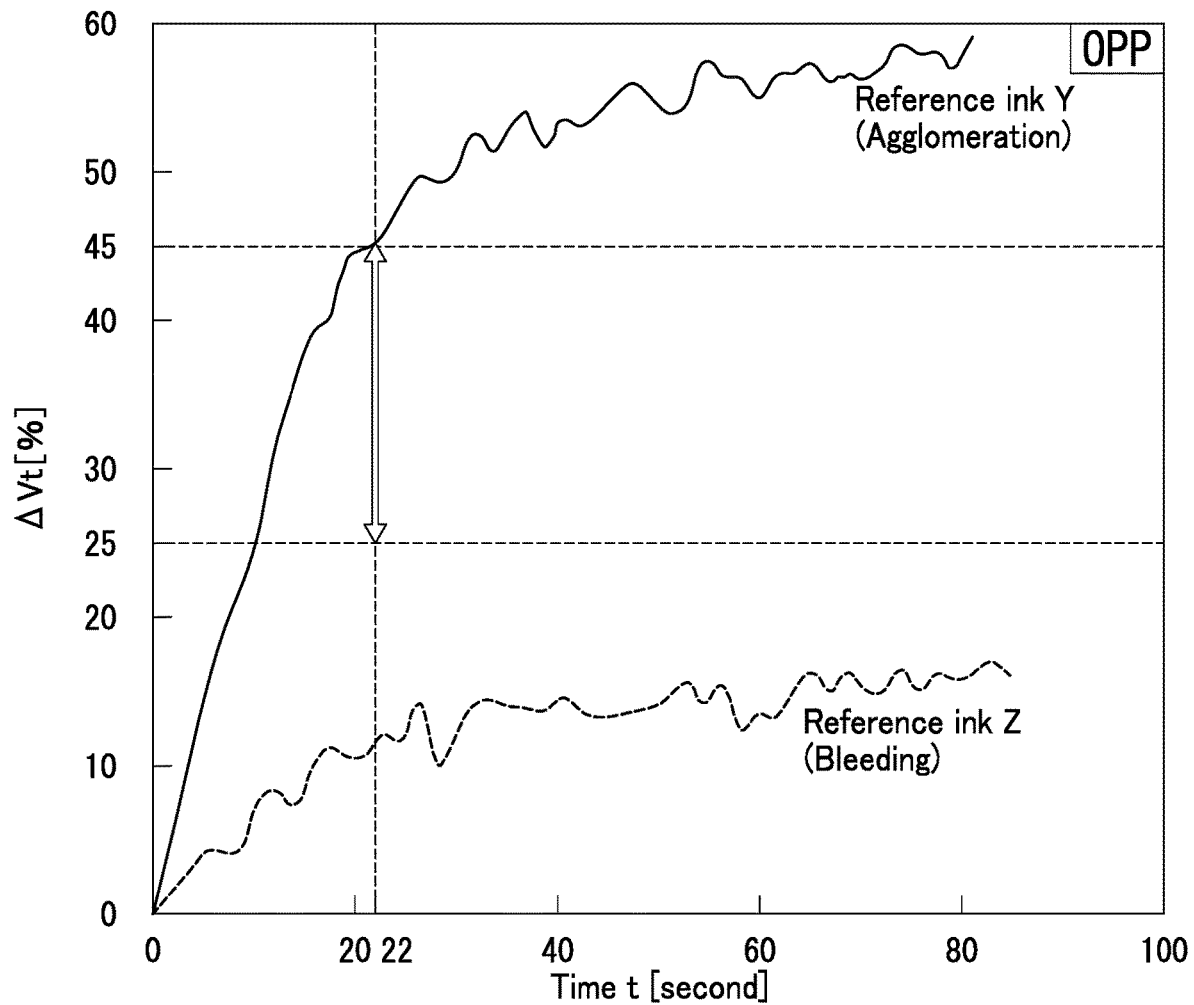
FIG. 1 is a graph representation showing a relationship between elapsed time t from landing of reference inks Y and Z on an oriented polypropylene substrate and volume reduction rates $\Delta Vt$ of the respective inks at the time t.

The terms used in the present specification will be explained first. In the following, the term "(meth)acryl" is used as a generic term for both acryl and methacryl. The term mass average molecular weight means a mass average molecular weight in terms of polystyrene as measured by gel permeation chromatography unless otherwise stated. The term dynamic surface tension means a surface tension at 50 msec. as measured by the maximum bubble pressure method unless otherwise stated. A dynamic surface tensiometer (product of KRUSS GmbH, product name: BP100) may for example be used for dynamic surface tension measurement by the maximum bubble pressure method. The viscosity of an ink is a value as measured in an environment at 25° C. in accordance with the method defined in "the Japanese Industrial Standards (JIS) Z 8803:2011, Methods for viscosity measurement of liquid" unless otherwise stated. The level of hydrophobicity (or the level of hydrophilicity) can be expressed by a contact angle of a water droplet, for example. The larger the contact angle of a water droplet is, the higher the hydrophobicity is. One type of each component described in the present specification may be used independently, or two or more types of the component may be used in combination. The terms used in the present specification have been explained so far.

[Inkjet Ink]

An inkjet ink (also referred to below simply as ink) according to a first embodiment will be described below.

<Volume Reduction Rate $\Delta V$>

The ink according to the first embodiment has a volume reduction rate $\Delta V$ of at least 25% and no greater than 45%. The volume reduction rate $\Delta V$ is calculated using formula (1).

$$\Delta V = 100 \times (V_0 - V_{22})/V_0 \quad (1)$$

In formula (1), $V_0$ represents a first volume of a liquid droplet of the ink at landing, on a non-absorbent recording medium, of the ink dropped onto the non-absorbent recording medium (i.e., time when 0 seconds elapse from landing of the liquid droplet of the ink on the non-absorbent recording medium). $V_{22}$ represents a second volume of the liquid droplet when 22 seconds elapse from the landing of the liquid droplet on the non-absorbent recording medium.

Note that dropping of the ink onto the non-absorbent recording medium forms the liquid droplet of the ink on the non-absorbent recording medium. The first volume and the second volume are measured in the course of measurement of volume change over time of one liquid droplet of the ink. The unit of measure for the first volume and the second volume is µL.

In image formation on the non-absorbent recording medium using the ink according to the first embodiment, the ink can inhibit occurrence of bleeding and unevenness in a formed image. The following describes the relationship between the volume reduction rate $\Delta Vt$ of the ink at a time t and bleeding and irregularity. The time t is elapsed time (unit: second) from landing of the ink on the non-absorbent recording medium. In the following the "volume reduction rate $\Delta Vt$ at the time t" may be referred to as "t-second volume reduction rate $\Delta Vt$".

Figure 2:
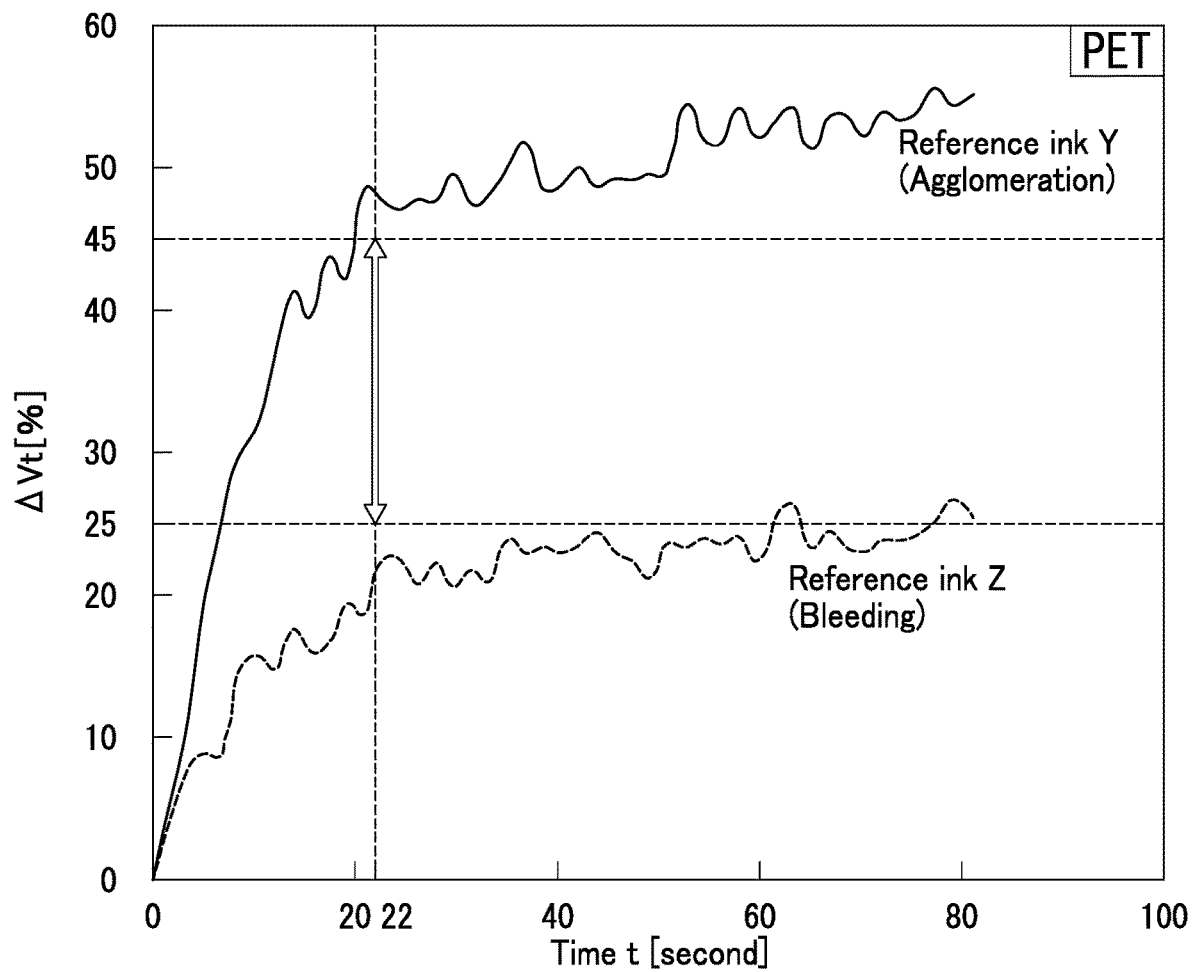
FIG. 2 is a graph representation showing a relationship between elapsed time t from landing of the reference inks Y and Z on a polyethylene terephthalate substrate and volume reduction rates $\Delta Vt$ of the respective ink at the time t.

FIG. 1 is a graph representation showing a relationship between elapsed time t from landing of reference inks Y and Z on an oriented polypropylene (also referred to below as OPP) substrate and t-second volume reduction rates $\Delta Vt$ of the respective inks. FIG. 2 is a graph representation showing a relationship between elapsed time t from landing of the reference inks Y and Z on a polyethylene terephthalate (PET) substrate and t-second volume reduction rates $\Delta Vt$ of the respective inks. In each of FIGS. 1 and 2, the horizontal axis indicates elapsed time t (unit: second) from landing of the respective inks Y and Z on the OPP substrate or the PET substrate while the vertical axis indicates the t-second volume reduction rates ΔVt (unit: %) of the respective inks. The OPP substrate and the PET substrate each are an example of the non-absorbent recording medium. The t-second volume reduction rate ΔVt of each ink is calculated using the following formula (2).

$$\Delta Vt = 100 \times (V_0 - Vt)/V_0 \quad (2)$$

In formula (2), $V_0$ is the same as that defined for $V_0$ in formula (1). Vt represents a volume of a liquid droplet of the ink when t seconds elapse from landing of the ink on the non-absorbent recording medium.

As shown in FIGS. 1 and 2, each ink on each non-absorbent recording medium dries on the non-absorbent recording medium and the t-second volume reduction rate ΔVt of the ink increases as time elapses from landing of the ink on the non-absorbent recording medium. Furthermore, where the time t is concurrent, an ink having a higher volume reduction rate ΔVt dries faster on the non-absorbent recording medium. The non-absorbent recording medium does not absorb water. Therefore, when an image is formed on a non-absorbent recording medium using a water-based ink containing water, bleeding and irregularity in a formed image can be inhibited by adjusting the t-second volume reduction rate ΔVt of the ink (eventually, drying speed of the ink) within the aforementioned range.

As shown in FIGS. 1 and 2, the t-second volume reduction rate ΔVt of the reference ink Y at a time (t=22) when 22 seconds elapse from landing thereof on the non-absorbent recording medium exceeds 45%. Therefore, the reference ink Y dries excessively fast to agglomerate ink components of the reference ink Y on the non-absorbent recording medium. When an image is formed on the non-absorbent recording medium with the reference ink Y as above, irregularity occurs in the formed image. By contrast, the t-second volume reduction rate ΔVt of the reference ink Z at a time (t=22) when 22 seconds elapse from landing on the non-absorbent recording medium is less than 25%. Therefore, the reference ink Z dries excessively slow to bleed in the non-absorbent recording medium. When an image is formed on the non-absorbent recording medium with the reference ink Z as above, bleeding occurs in the formed image.

As can be understood from FIGS. 1 and 2, the following advantages can be brought even when the non-absorbent recording medium is either an OPP substrate or a PET substrate. That is, when the t-second volume reduction rate ΔVt of the ink at a time (t=22) when 22 seconds elapse from landing of a liquid droplet of the ink on the non-absorbent recording medium is at least 25% and no greater than 45%, the ink hardly bleeds in the non-absorbent recording medium and the ink components of the ink hardly agglomerate on the non-absorbent recording medium. As a result, occurrence of bleeding and irregularity in an image formed on the non-absorbent recording medium can be inhibited. From the above, the volume reduction rate ΔV (i.e., t-second volume reduction rate ΔVt at t=22) of the ink according to the first embodiment is set to at least 25% and no greater than 45%.

In terms of inhibition of bleeding and irregularity in an image formed on the non-absorbent recording medium, the volume reduction rate ΔV of the ink is preferably at least 30% and no greater than 40%. The volume reduction rate ΔV of the ink is measured in a sealed environment with no wind at a temperature of 25° C. and a relative humidity of 50% under an air pressure (760 mmHg) using a contact angle measuring device equipped with a syringe. Details of a method for measuring the volume reduction rate ΔV of the ink will be described later in Examples.

In order to inhibit occurrence of bleeding in an image formed on the non-absorbent recording medium, a dry film formation time of the ink is preferably within 22 seconds. The dry film formation time is a time from landing, on the non-absorbent recording medium, of a liquid droplet of the ink dropped onto the non-absorbent recording medium to formation of a dry film on the surface of the liquid droplet of the ink. The dry film formation time of the ink is measured using a contact angle measuring device equipped with a syringe in an environment at a temperature of 25° C. and a relative humidity of 50%. Details of a method for measuring the dry film formation time of the ink will be described later in Examples. Note that although the time when an ink (black ink) in the second color is dropped is set to 22 seconds after landing of an ink in the first color in the measurement method described later in Example, the dry film formation time can be further specifically determined by repeating the measurement with the time of dropping the black ink changed.

The ink according to the first embodiment preferably contains a pigment, a cellulose derivative, a first water-soluble organic solvent, a second water-soluble organic solvent, water, and a binder resin. Preferably, the ink according to the first embodiment further contains a surfactant. The following describes the pigment, the cellulose derivative, the first water-soluble organic solvent, the second water-soluble organic solvent, the water, the binder resin, and the surfactant.

<Cellulose Derivative>

As a result of the ink containing a cellulose derivative, the volume reduction rate ΔV of the ink can be easily adjusted to at least 25%. An ink such as above increases in viscosity when landing on the non-absorbent recording medium, and dries moderately fast. As a result, occurrence of bleeding in an image formed on the non-absorbent recording medium can be inhibited.

The cellulose derivative has a percentage content of preferably at least 0.01% by mass and no greater than 0.20% by mass to the mass of the ink, and more preferably at least 0.01% by mass and no greater than 0.07% by mass. As a result of the content percentage of the cellulose derivative being set to within the above range, the volume reduction rate ΔV of the ink can be easily adjusted to at least 25% and no greater than 45%. As a result, the drying speed of the ink can be adjusted to a value within a desired range to inhibit occurrence of bleeding and irregularity of an image formed on the non-absorbent recording medium.

Examples of the cellulose derivative include sodium salt of carboxymethyl cellulose (also referred to below as "sodium carboxymethylcellulose"), calcium salt of carboxymethyl cellulose, methylcellulose, hydroxypropyl methylcellulose, hydroxypropyl cellulose, ethyl cellulose, and methylethyl cellulose.

In order to inhibit occurrence of bleeding and irregularity in an image formed on the non-absorbent recording medium, the cellulose derivative is preferably sodium carboxymethylcellulose. Carboxymethyl cellulose has a structure in which a carboxymethyl group is ether-bonded to a hydroxyl group in an anhydroglucose unit of cellulose (in other words, a structure in which a hydrogen atom of a hydroxyl group in an anhydroglucose unit is substituted with a carboxymethyl group).

In order to inhibit occurrence of bleeding and irregularity in an image formed on the non-absorbent recording medium, the degree of etherification of sodium carboxymethylcellulose is preferably at least 0.6 and no greater than 1.5, and more preferably at least 0.8 and less than 1.0 or at least 1.0 and no greater than 1.5. In the present specification, the degree of etherification of sodium carboxymethylcellulose means an average value of the numbers of moles of a carboxymethyl group per 1 mole of anhydroglucose unit.

A commercially available sodium carboxymethylcellulose can be used as the sodium carboxymethylcellulose. Examples of commercially available sodium carboxymethylcellulose with a degree of etherification of at least 0.6 and no greater than 1.5 include CMC DAICEL (registered Japanese trademark) 1120, CMC DAICEL 1130, CMC DAICEL 1140, CMC DAICEL 1150, CMC DAICEL 1220, CMC DAICEL 1240, CMC DAICEL 1250, CMC DAICEL 1260, CMC DAICEL 1330, and CMC DAICEL 1350 each produced by Daicel Miraizu Ltd.

A 1%-by-mass aqueous solution of sodium carboxymethylcellulose at 25° C. has a viscosity of at least 10 mPa·s and no greater than 300 mPa·s, more preferably at least 10 mPa·s and no greater than 100 mPa·s, further preferably at least 10 mPa·s and no greater than 20 mPa·s, at least 30 mPa·s and no greater than 40 mPa·s, or at least 50 mPa·s and no greater than 100 mPa·s. As a result of the viscosity of the 1%-by-mass aqueous solution of the sodium carboxymethylcellulose at 25° C. being set to within the above range, the viscosity of the ink can be easily adjusted to within a range suitable for inkjet recording. For measurement of the viscosity of the 1%-by-mass aqueous solution of the sodium carboxymethylcellulose, a vibration viscometer (product of Sekonic Cooperation, product name: VM-10A-L) can be used, for example.

<First Water-Soluble Organic Solvent>

The first water-soluble organic solvent is glycol ether. Glycol ether has relatively high hydrophobicity. As a result of containing glycol ether, which is highly hydrophobic, the ink can get readily wet to a non-absorbent recording medium that does not absorb water, thereby inhibiting occurrence of bleeding and irregularity in an image formed on the non-absorbent recording medium.

The glycol ether is preferably an alkyl ether with a carbon number of at least of 1 and no greater than 6 of alkylene glycol with a carbon number of at least 2 and no greater than 6, and more preferably an alkyl ether with a carbon number of at least 1 and no greater than 4 of an alkylene glycol with a carbon number of at least 2 and no greater than 3. Further preferably, the glycol ether is at least one (e.g., one) selected from the group consisting of propylene glycol monomethyl ether, propylene glycol monopropyl ether, dipropylene glycol monomethyl ether, dipropylene glycol monopropyl ether, and triethylene glycol monobutyl ether. Still more preferably, the glycol ether is dipropylene glycol monomethyl ether or triethylene glycol monobutyl ether.

The glycol ether has a percentage content of preferably at least 6% by mass and no greater than 24% by mass to the mass of the ink, more preferably at least 10% by mass and no greater than 24% by mass, and further preferably at least 12% by mass and no greater than 18% by mass. When the percentage content of the glycol ether is within the above range, the ink can have increased wettability to the non-absorbent recording medium and occurrence of bleeding and irregularity in an image formed on the non-absorbent recording medium can be inhibited.

The glycol ether preferably has a percentage content of at least 40% by mass and no greater than 50% by mass to the total mass of the first water-soluble organic solvent and the second water-soluble organic solvent. As a result of the percentage content of the glycol ether being within the above range, the ink dries at a moderate rate, thereby inhibiting occurrence of bleeding and irregularity in an image formed on the non-absorbent recording medium.

<Second Water-Soluble Organic Solvent>

The second water-soluble organic solvent is a water-soluble organic solvent that is not glycol ether. Examples of the second water-soluble organic solvent include propylene glycol (i.e., 1,2-propanediol), 3-methyl-1,3-butanediol, 1,2-pentanediol, 2-methyl-1,3-propanediol, 1,3-propanediol, dipropylene glycol, 1,5-pentanediol, 3-methyl-1,5-pentanediol, ethylene glycol, 2-pyrrolidone, and glycerin.

The second water-soluble organic solvent is preferably alkane polyol or polyalkylene glycol, more preferably alkanediol or dialkylene glycol, and further preferably alkanediol with a carbon number of at least 3 and no greater than 6 or dialkylene glycol with a carbon number of at least 4 and no greater than 6. Furthermore preferably, the second water-soluble organic solvent is at least one (e.g., one) selected from the group consisting of propylene glycol, 3-methyl-1,3-butanediol, 1,2-pentanediol, 2-methyl-1,3-propanediol, 1,3-propanediol, 1,5-pentanediol, and 3-methyl-1,5-pentanediol. Particularly preferably, the second water-soluble organic solvent is propylene glycol.

<Water>

The water contained in the ink is ion exchange water (deionized water), for example. From the viewpoint of favorably drying the ink landed on the non-absorbent recording medium, the water has a percentage content of preferably at least 45% by mass to the mass of the ink, more preferably at least 50% by mass, and further preferably at least 55% by mass. From the same viewpoint as above, the percentage content of the water is preferably no greater than 70% by mass.

<Pigment>

No particular limitations are placed on the pigment contained in the ink, and examples of the pigment include a black pigment, a cyan pigment, a magenta pigment, a yellow pigment, a white pigment, and a pigment (also referred to below as additional pigment) other than these.

The black pigment may be carbon black produced by the channel method or the furnace method. Examples of commercially available carbon black include RAVEN (registered Japanese trademark) 5000 ULTRA II, RAVEN 3500, RAVEN 2000, RAVEN 1255, RAVEN 1250, RAVEN 1200, RAVEN 1190 ULTRA, RAVEN 1170, RAVEN 1080 ULTRA, and RAVEN 1060 ULTRA each produced by Aditya Birla Chemicals LTD. Other examples of the commercially available carbon black include MONARCH (registered Japanese trademark) 1300, MONARCH 1000, MONARCH 800, MONARCH 700, MOGUL (registered Japanese trademark) L, REGAL (registered Japanese trademark) 400R, REGAL 660R, and REGAL 330R each produced by Cabot Corporation. Still other examples of the commercially available carbon black include MITSUBISI (registered Japanese trademark) CARBON BLACK #2300, MITSUBISHI CARBON BLACK #980, MITSUBISHI CARBON BLACK #970, MITSUBISHI CARBON BLACK #960, MITSUBISHI CARBON BLACK #950, MITSUBISHI CARBON BLACK #900, MITSUBISHI CARBON BLACK #850, MITSUBISHI CARBON BLACK MCF88, MITSUBISHI CARBON BLACK MA600, MITSUBISHI CARBON BLACK #52, MITSUBISHI CARBON BLACK #47, MITSUBISHI CARBON BLACK #45, MITSUBISHI CARBON BLACK #40, MITSUBISHI CARBON BLACK #33, MITSUBISHI CARBON BLACK #25, MITSUBISHI CARBON BLACK MA7, MITSUBISHI CARBON BLACK MA8, and MITSUBISHI CARBON BLACK MA100 each produced by Mitsubishi Chemical Corporation. Still other examples of the commercially available carbon black include COLOUR BLACK FW 1, COLOUR BLACK FW 2, COLOUR BLACK FW 200, COLOUR BLACK FW 18, SPECIAL BLACK 6, COLOUR BLACK S 160, SPECIAL BLACK 5, PRINTEX (registered Japanese trademark) U, PRINTEX V, SPECIAL BLACK 4, SPECIAL BLACK 4A, PRINTEX 140 U, PRINTEX 140 V, and PRINTEX 35 each produced by Orion Engineered Carbons.

Examples of the cyan pigment include C.I. Pigment Blue 1, C.I. Pigment Blue 2, C.I. Pigment Blue 3, C.I. Pigment Blue 15:3, C.I. Pigment Blue 15:4, C.I. Pigment Blue 16, C.I. Pigment Blue 22, C.I. Vat Blue 4, and C.I. Vat Blue 6.

Examples of the magenta pigment include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, and C.I. Pigment Violet 19.

Examples of the yellow pigment include C.I. Pigment Yellow 12, C.I. Pigment Yellow 13, C.I. Pigment Yellow 14, C.I. Pigment Yellow 17, C.I. Pigment Yellow 74, C.I. Pigment Yellow 83, C.I. Pigment Yellow 93, C.I. Pigment Yellow 94, C.I. Pigment Yellow 95, C.I. Pigment Yellow 120, C.I. Pigment Yellow 128, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Examples of the white pigment include C.I. Pigment White 4, C.I. Pigment White 5, C.I. Pigment White 6, C.I. Pigment White 6:1, C.I. Pigment White 7, C.I. Pigment White 18, C.I. Pigment White 19, C.I. Pigment White 20, C.I. Pigment White 21, C.I. Pigment White 23, C.I. Pigment White 24, C.I. Pigment White 25, C.I. Pigment White 26, C.I. Pigment White 27, and C.I. Pigment White 28.

Examples of the additional pigment include C.I. Pigment Green 7, C.I. Pigment Green 10, C.I. Pigment Green 36, C.I. Pigment Brown 3, C.I. Pigment Brown 5, C.I. Pigment Brown 25, C.I. Pigment Brown 26, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 62, C.I. Pigment Orange 63, C.I. Pigment Orange 64, and C.I. Pigment Orange 71.

From the viewpoint of favorably ejecting the ink from a recording head, the pigment preferably has a percentage content of at least 0.1% by mass and no greater than 15% by mass to the mass of the ink.

The pigment is preferably used in a state of being dispersed in a dispersion medium (e.g., water). The pigment may be a pigment (non-self-dispersion type pigment) dispersed in a dispersion medium by a dispersant or a pigment (self-dispersion type pigment) dispersing in the dispersion medium without a dispersant. Examples of the dispersant include a surfactant and a macromolecular dispersant (also referred to below as "pigment dispersion resin"). Note that the surfactant will be described later.

The pigment dispersion resin attaches to the surfaces of pigment particles to disperse the pigment particles in the ink. Note that a portion of the pigment dispersion resin may not attach to the surfaces of the pigment particles and be free in the ink. Examples of the pigment dispersion resin include acrylic resin, styrene-acrylic resin, and styrene-maleic acid resin.

The pigment dispersion resin has a mass average molecular weight of preferably at least 5000 and no greater than 100,000, more preferably at least 10,000 and no greater than 50,000, and further preferably at least 15,000 and no greater than 30,000. When the mass average molecular weight of the pigment dispersion resin is at least 5000, dispersion stability of the ink increases. When the mass average molecular weight of the pigment dispersion resin is no greater than 100,000, the ink can be favorably ejected from the recording head.

The ratio of the mass of the pigment dispersion resin to the mass of the pigment is preferably at least 0.02 and no greater than 0.45, more preferably at least 0.04 and no greater than 0.40, and further preferably at least 0.05 and no greater than 0.35. When the ratio of the mass of the pigment dispersion resin to the mass of the pigment is no greater than 0.45, each viscosity of the pigment dispersion and the ink can be easily adjusted to a desired value. When the ratio of the mass of the pigment dispersion resin to the mass of the pigment is at least 0.02, dispersion stability of the ink increases.

The pigment dispersion resin may be a commercially available pigment dispersion resin. Examples of the commercially available pigment dispersion resin include: JONCRYL (registered Japanese trademark) 586 and JONCRYL 611 each produced by BASF Japan Ltd.; DISPERBYK (registered Japanese trademark)-190 and DISPERBYK-191 each produced by BYK Chemie Japan KK; and SOLSPERSE 20000 and SOLSPERSE 27000 each produced by Lubrizol Japan Limited.

<Binder Resin>

The binder resin protects the pigment from the action of external forces in a manner that the pigment covered with the binder resin attaches to a recording medium after ink landing. As a result, an image excellent in scratch resistance may be formed.

The binder resin is a water-insoluble resin, for example. No particular limitations are placed on the binder resin, and examples of the binder resin include urethane resin, acrylic resin, styrene-acrylic resin, acryl-urethane resin, polyester resin, and modified polyolefin resin. The binder resin is preferably urethane resin, acrylic resin, or styrene-acrylic resin, and more preferably urethane resin.

The water-insoluble resin is preferably used in a state of resin emulsion. Where the water-insoluble resin in a state of resin emulsion is used, emulsified particles constituted by the water-insoluble resin are contained and dispersed in the ink. The resin emulsion may be a commercially available resin emulsion.

No particular limitations are placed on the urethane resin only when it has a urethane bond in its molecule. Examples of a commercially available emulsion of urethane resin include: SUPERFLEX (registered Japanese trademark) 170, SUPERFLEX 210, SUPERFLEX 820, and SUPERFLEX 870 each produced by DKS Co. Ltd.; and TAKELAC (registered Japanese trademark) W-6010 and TAKELAC W-6020 each produced by Mitsui Chemicals, Inc.

Examples of a commercially available emulsion of acrylic resin include MOWINYL (registered Japanese trademark) 6718, MOWINYL 6751D, MOWINYL 6750, MOWINYL 6760, MOWINYL 6770, MOWINYL 6800, MOWINYL 6969D, MOWINYL 6899D, and MOWINYL 6820 each produced by Japan Coating Resin Corporation.

Examples of a commercially available emulsion of styrene-acrylic resin include: MOWINYL 6960, MOWINYL 6963, and MOWINYL RS-009C22 each produce by Japan Coating Resin Corporation; and QE-1042 produced by SEIKO PMC CORPORATION.

The percentage content of the binder resin is preferably at least 0.1% by mass and no greater than 10% by mass to the mass of the ink in terms of favorable ejection of the ink from the recording head.

<Surfactant>

Preferably, the surfactant is nonionic. Examples of the surfactant include an acetylene surfactant, an acrylic surfactant, a silicone surfactant, and a fluoric surfactant. The surfactant may be a commercially available surfactant.

In the present specification, the acetylene surfactant means a surfactant having an acetylene bond (triple bond of carbon atoms) in its molecule. Examples of a commercially available acetylene surfactant include: SURFYNOL (registered Japanese trademark) 420, SURFYNOL 440, OLFINE (registered Japanese trademark) E1010, OLFINE EXP. 4200, and OLFINE EXP. 4300 each produced by Nissin Chemical Industry Co., Ltd.; and POLYFLOW (registered Japanese trademark) KL-850 and POLYFLOW KL-870 each produced by Kyoeisha Chemical Co., Ltd.

In the present specification, the acrylic surfactant means a surfactant of a polymer of (meth)acrylic acid or a derivative thereof. Examples of a commercially available acrylic surfactant include: BYK (registered Japanese trademark)-380 N and BYK-381 each produced by BYK Chemie Japan, KK; and POLYFLOW KL-850 produced by Kyoeisha Chemical Co., Ltd.

In the present specification, the silicone surfactant means a surfactant having a siloxane bond in its molecule. Examples of a commercially available silicone surfactant include SILFACE (registered Japanese trademark) SAG002 and SILFACE SAG503A each produced by Nissin Chemical Industry Co., Ltd.

In the present specification, the fluoric surfactant means a surfactant having a fluoro group in its molecule. Example of a commercially available fluoric surfactant include CAPSTONE FS-30, CAPSTONE FS-31, CAPSTONE FS-65, and CAPSTONE FS-3100 each produced by Chemours Kabushiki Kaisha.

Preferably, the ink contains both an acrylic surfactant and a silicone surfactant each as a surfactant. As a result of the ink containing both an acrylic surfactant and a silicone surfactant, the volume reduction rate $\Delta V$ of the ink can be easily adjusted to at least 25% and no greater than 45%. As a result, the drying speed of the ink can be adjusted to a value within a desired range to inhibit occurrence of bleeding and irregularity of an image formed on the non-absorbent recording medium. In the ink, a ratio Wa/Ws of a mass Wa of the acrylic surfactant to a mass Ws of the silicone surfactant is preferably at least 0.1 and no greater than 5, and more preferably at least 0.6 and no greater than 0.8. Further preferably, the ink further contains an amphipathic oligomer as a surfactant in addition to the acrylic surfactant and the silicone surfactant.

The percentage content of the surfactant is preferably at least 0.05% by mass and no greater than 2% by mass to the mass of the ink. When the percentage content of the surfactant is within the above range, the dynamic surface tension of the ink can be easily adjusted to within a range suitable for inkjet recording. In a case in which the ink contains two or more surfactants, the percentage content of the surfactant is the total percentage content of the two or more surfactants.

<Additional Components>

The ink may contain any of additional components as necessary. Examples of the additional components include a pH adjuster, a chelating agent, a preservative, and an antifungal agent. No particular limitations are placed on the percentage content of each additional component, and the percentage content of the additional component may be set as appropriate according to necessity.

<Pigment Dispersion Production Method>

The pigment dispersion is used for ink production. No particular limitations are placed on a method for producing the pigment dispersion, and an example of the method is mixing a pigment, water, and a dispersant added as necessary using a disperser.

No particular limitations are placed on the disperser, and the disperser may be a ball mill or a bead mill, for example. Of the mills, the bead mill is preferably used. Examples of the bead mill include an ATTRITOR (registered Japanese trademark) produced by Nippon Coke & Engineering Co., Ltd., a sand grinder produced by Aimex Co. Ltd., a DYNO (registered Japanese trademark) MILL produced by Willy A. Bachofen AG, and an ultra-apex mill produced by METAL & MACHINERY CO., LTD.

Where coarse particles are contained in the resultant pigment dispersion, the coarse particles are preferably removed by filtration or centrifugation. Removal of the coarse particles can prevent clogging in the ejection ports of the recording head.

<Ink Production Method>

For example, a method for producing the ink includes mixing a pigment dispersion containing the pigment, the cellulose derivative, the first water-soluble organic solvent, the second water-soluble organic solvent, the water, and the binder resin. At least one selected from the group consisting of the surfactant and the additional components may be further mixed as necessary. The ink production method may further include removing insoluble matter by filtration. The ink according to the first embodiment has been described so far.

Although the ink according to the present disclosure has been described so far, an ink (also referred to below as ink of a different aspect) different from the above ink can be favorably used. The ink of the different aspect has the following features. That is, the ink of the different aspect contains a pigment, a cellulose derivative, a first water-soluble organic solvent, a second water-soluble organic solvent, water, and a water-insoluble resin. The first water-soluble organic solvent is glycol ether. The second water-soluble organic solvent is a water-soluble organic solvent that is not glycol ether. The cellulose derivative has a percentage content of at least 0.01% by mass and no greater than 0.20% by mass to the mass of the ink. The glycol ether has a percentage content of at least 12% by mass and no greater than 18% by mass to the mass of the ink. The glycol ether has a percentage content of at least 40% by mass and no greater than 50% by mass to the total mass of the first water-soluble organic solvent and the second water-soluble organic solvent. The ink of the different aspect further contains both an acrylic surfactant and a silicone surfactant. The percentage content of the cellulose derivative is at least 0.01% by mass and no greater than 0.07% by mass to the mass of the ink of the different aspect. The features of the ink of the different aspect have been described so far. In image formation on the non-absorbent recording medium using the ink of the different aspect, the ink can inhibit occurrence of bleeding and unevenness in a formed image. Note that the volume reduction rate ΔV of the ink of the different aspect is not limited specifically.

Second Embodiment: Inkjet Recording Method

An inkjet recording method according to a second embodiment of the present disclosure will be described next with reference to FIG. 3. The inkjet recording method according to the second embodiment of the present disclosure includes ejecting (ejection step) an ink toward a recording medium 1 (specifically, a non-absorbent recording medium). The ink to be ejected is the ink according to the first embodiment. The inkjet recording method according to the second embodiment uses the ink according to the first embodiment. Therefore, for the same reason as those described in the first embodiment, the inkjet recording method according to the second embodiment can inhibit occurrence of bleeding and irregularity in a formed image in image formation on the non-absorbent recording medium.

Figure 3:
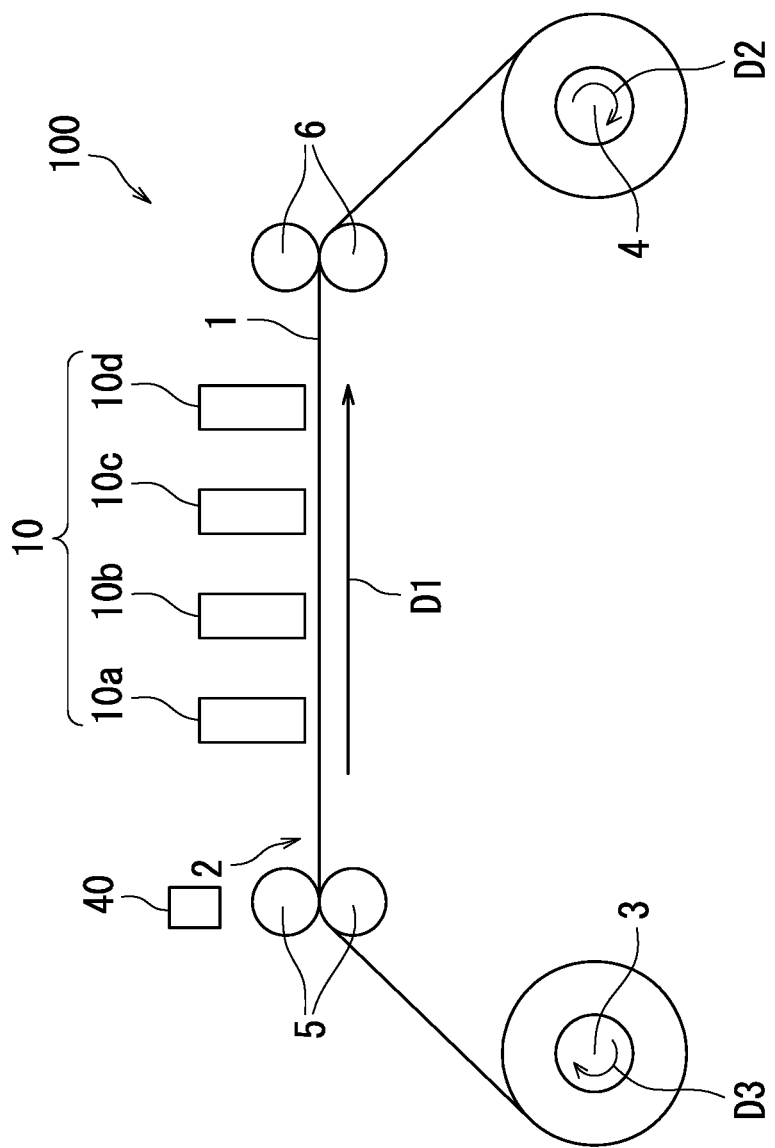
FIG. 3 is a diagram illustrating an example of an inkjet recording apparatus used in an inkjet recording method according to a second embodiment of the present disclosure.

The inkjet recording method according to the second embodiment is implemented by an inkjet recording apparatus 100 illustrated in FIG. 3, for example. The recording medium 1 is set in the inkjet recording apparatus 100. The inkjet recording apparatus 100 includes a recording medium conveyance path 2, a feeding rotary shaft 3, a winding rotary shaft 4, a first conveyance roller pair 5, a second conveyance roller pair 6, a first recording head 10a, a second recording head 10b, a third recording head 10c, a fourth recording head 10d, and a controller 40. In the following, the first recording head 10a, the second recording head 10b, the third recording head 10c, and the fourth recording head 10d may each be referred to as "recording head 10" when there is no need to distinguish thereamong.

The recording medium 1 is rolled in a roll. The recording medium 1 is a non-absorbent recording medium. Examples of the non-absorbent recording medium includes foil paper, synthesized paper, and a plastic substrate. Examples of the plastic substrate include a polyester (specifically, PET) substrate, a polypropylene (specifically, OPP) substrate, a polystyrene substrate, a polyvinyl chloride substrate. Either or both sides of the non-absorbent recording medium may be subjected to surface treatment. Examples of the surface treatment include corona discharge treatment, plasma treatment, and primer treatment.

The rolled recording medium 1 is set to the feeding rotary shaft 3. The feeding rotary shaft 3 feeds the rolled recording medium 1 to the first conveyance roller pair 5.

The first conveyance roller pair 5 conveys the recording medium 1 to the recording medium conveyance path 2.

The recording medium conveyance path 2 is a travel path of the recording medium 1 formed between the first conveyance roller pair 5 and the second conveyance roller pair 6. When the recording medium 1 is wound to the winding rotary shaft 4 as the winding rotary shaft 4 rotates, the recording medium 1 is conveyed in a conveyance direction (direction indicated by an arrow D1 in FIG. 3) of the recording medium 1 along the recording medium conveyance path 2. The first recording head 10a, the second recording head 10b, the third recording head 10c, and the fourth recording head 10d are disposed along the recording medium conveyance path 2 in the stated order from upstream in the conveyance direction of the recording medium 1.

In the ejection step, each recording head 10 ejects an ink toward the recording medium 1 from a plurality of ejection ports (not illustrated) in the ejection surface of the recording head 10. For example, the first recording head 10a, the second recording head 10b, the third recording head 10c, and the fourth recording head 10d respectively eject a first ink, a second ink, a third ink, and a fourth ink toward the recording medium 1. The first ink, the second ink, the third ink, and the fourth ink are inks (e.g., a cyan ink, a magenta ink, a yellow ink, and a black ink) in different colors. Through the above, a color image is formed on the recording medium 1. No particular limitations are placed on each recording head 10, and the recording head 10 is for example a piezoelectric inkjet recording head or a thermal inkjet recording head.

The second conveyance roller pair 6 conveys to the winding rotary shaft 4 the recording medium 1 with the image formed as a result of ejection of the inks from the recording heads 10.

The winding rotary shaft 4 winds in a roll the recording medium 1 with the image formed as a result of ejection of the inks from the recording heads 10. One end of the recording medium 1 is set at the feeding rotary shaft 3 while the other end thereof is set at the winding rotary shaft 4. When the driving force generated in a non-illustrated motor is transmitted to the winding rotary shaft 4, the winding rotary shaft 4 rotates in its rotational direction (direction indicated by an arrow D2 in FIG. 3). As the winding rotary shaft 4 rotates, the recording medium 1 is wound to the winding rotary shaft 4. According to winding of the recording medium 1, the feeding rotary shaft 3 passively rotates in its rotational direction (direction indicated by an arrow D3 in FIG. 3) to feed the recording medium 1.

The controller 40 is constituted by a central processing unit (CPU), read-only memory, and random-access memory, for example. The controller 40 performs overall control on the inkjet recording apparatus 100.

For example, the controller 40 controls the rotational speed of the winding rotary shaft 4 according to a printing speed set by a user to control the conveyance speed of the recording medium 1. The conveyance speed of the recording medium 1 is preferably at least 20 m/min. and no greater than 100 m/min. Even if the conveyance speed of the recording medium 1 is high such as at least 20 m/min. and no greater than 100 m/min., the inkjet recording apparatus 100 can inhibit occurrence of bleeding and irregularity in an image formed on the recording medium 1.

The inkjet recording method according to the second embodiment has been described so far with reference to FIG. 3. However, the inkjet recording method according to the second embodiment is not limited to the above inkjet recording method and can be altered as in the following first to fourth variations.

The first variation is as follows. The above inkjet recording method uses a recording medium 1 in a roll as an example. However, the recording medium 1 may be a recording medium cut into a specific size (e.g., A4 size).

The second variation is as follows. The above inkjet recording method is implemented by the inkjet recording apparatus 100 that includes four recording heads of the first recording head 10a, the second recording head 10b, the third recording head 10c, and the fourth recording head 10d. However, the number of the recording heads 10 is not limited specifically. For example, the inkjet recording method may be implemented by an inkjet recording apparatus including one or a plurality of (e.g., two, three, or five or more) recording heads 10.

The third variation is as follows. The above inkjet recording method is implemented by the inkjet recording apparatus 100 that does not include a wiping blade, but may be implemented by an inkjet recording apparatus including wiping blades for wiping the ejection surfaces of the recording heads 10.

The fourth variation is as follows. The above inkjet recording method is implemented by the inkjet recording apparatus 100 that includes neither a conveyance plate nor a conveyance belt, but may be implemented by an inkjet recording apparatus including a conveyance plate or a conveyance belt for conveying the recording medium 1. The inkjet recording method according to the second embodiment has been described so far.

EXAMPLES

The following indicates examples for further description of the present disclosure. However, the present disclosure is not limited to the following examples.
[Ink Production]
Inks (A-1) to (A-10) of Examples and inks (B-1) to (B-7) of Comparative Examples were produced. Compositions of these inks are shown in Tables 1 and 2 described later. Note that although the inks (B-1) and (B-3) have the same composition as each other and the inks (B-2) and (B-4) have the same composition as each other, different reference signs are assigned for the sake of explanation.
<Pigment Dispersion Production>
First, a pigment dispersion for ink production use was produced. A pre-dispersion was obtained by mixing and pre-dispersing 15 parts by mass of a cyan pigment ("HELIOGEN (registered Japanese trademark) BLUE D 7088", product of BASF Japan Ltd., C.I. Pigment Blue 15:3), 10 parts by mass of a pigment dispersion resin (product of BYK Chemie Japan KK, product name: DISPERBYK-190, non-volatile component content: 40% by mass, dispersion medium: water), and 75 parts by mass of ion exchange water using a disperser. Next, the pre-dispersion was further dispersed using a bead mill ("DYNO (registered Japanese trademark) MILL", product of Willy A. Bachofen A G) with zirconia beads with a diameter of 0.3 mm loaded therein to obtain a pigment dispersion.
<Production of Ink (A-1)>
Components are mixed to achieve the composition shown in the column titled Ink (A-1) in Table 1 using a stirrer to obtain a mixture. Specifically, the mixture was obtained by mixing 20.00% by mass of the pigment dispersion, 3.00% by mass of an emulsion ("SUPERFLEX 870", product of DKS Co. Ltd.) of a water-insoluble resin, 0.06% by mass of sodium carboxymethylcellulose (product of Daicel Miraizu Ltd., product name: "CMC DAICEL 1330, degree of etherification: 1.3), 18.00% by mass of propylene glycol, 12.00% by mass of dipropylene glycol monomethyl ether, 0.40% by mass of an acrylic surfactant ("POLYFLOW (registered Japanese trademark) KL-870", product of Kyoeisha Chemical Co., Ltd., effective components: 35±5% by mass of acrylic polymer and 55±5% by mass of amphipathic oligomer, solvent: 7% by mass of water), 0.20% by mass of a silicone surfactant ("SILFACE (registered Japanese trademark) SAG503A", product of Nissin Chemical Industry Co., Ltd., polarity: nonionic, effective component: polyether-modified silicone, effective component concentration: 100% by mass), and the remaining amount (46.34% by mass) of ion exchange water. The resultant mixed liquid was filtered using a membrane filter with a pore size of 5 μm to obtain an ink (A-1). The ink (A-1) had a pigment concentration of 3.00% by mass.

<Production of Inks (A-2) to (A-10) and (B-1) to (B-7)>
Inks (A-2) to (A-10) and (B-1) to (B-7) were produced according to the same method as that for producing the ink (A-1) in all aspects other than mixing of components to achieve the respective compositions shown in the columns titled Inks (A-2) to (A-10) and (B-1) to (B-7) in Tables 1 and 2.
[Measurement of Volume Reduction Rate ΔV]
The volume reduction rate ΔV of each ink was measured in a sealed environment with no wind at a temperature of 25° C. and a relative humidity of 50% under the air pressure (760 mmHg). A contact angle measuring device ("OCA40", product of EKO Instruments B.V.) equipped with a syringe (electric syringe, syringe diameter: 0.7 mm) was used to measure the volume reduction rate ΔV of the ink. The ink in an amount of 1 μL was caused to drop and land onto a non-absorbent recording medium from the syringe of the contact angle measuring device. For a liquid droplet of the ink landed on the non-absorbent recording medium, a first volume $V_0$ of the liquid droplet at landing (i.e., at a time when 0 seconds has elapsed from the landing) and a second volume $V_{22}$ of the liquid droplet at a time when 22 seconds has elapsed from the landing were measured using the contact angle measuring device. Using formula (1), a volume reduction rate ΔV of the ink was calculated from the first volume $V_0$ and the second volume $V_{22}$ measured as above. The calculated volume reduction rates ΔV of the inks are shown in Tables 1 and 2. Furthermore, types of the non-absorbent recording medium used in the measurement and later-described evaluation are shown in Tables 1 and 2.
[Evaluation]
<Evaluation of Agglomeration Inhibition>
After the above-described measurement of the volume reduction rates ΔV, the liquid droplet of the ink landed on the non-absorbent recording medium was observed under magnification using a high-speed camera to determine whether or not agglomeration of the ink components had occurred. Evaluation criteria are indicated below. Note that the harder it is for ink components of an ink to agglomerate on a non-absorbent recording medium, the less likely it is that irregularity will occur in a formed image in image formation with the ink on the non-absorbent recording medium.
(Evaluation Criteria of Agglomeration Inhibition)
A (Good): agglomeration has not occurred
B (Poor): agglomeration has occurred
<Evaluation of Bleeding Inhibition and Investigation of Dry Film Formation Time>
First, black inks for use in evaluation of bleeding inhibition were prepared. The black inks corresponding to the respective inks (A-1) to (A-10) and (B-1) to (B-7) each being a cyan ink were obtained according to the same method as that described above in [Ink Production] in all aspects other than change from the cyan pigment to black pigment ("PRINTEX (registered Japanese trademark) 85", product of Orion Engineered Carbons).
According to the same method as that described above in [Measurement of Volume Reduction Rate ΔV], 1 μL of the ink (any of the inks (A-1) to (A-10) and (B-1) to (B-7) each being a cyan ink) was drop and land onto a non-absorbent recording medium. After 22 seconds had elapsed from the landing, 1 μL of the black ink corresponding to the cyan ink was additionally drop onto the liquid droplet of the cyan ink from the syringe of the contact angle measuring device. Thereafter, occurrence or non-occurrence of color mixing of the cyan ink and the black ink was determined by naked eye. When the cyan ink dries slowly to bleed into the non-absorbent recording medium, color mixing tends to occur.

Therefore, bleeding was determined to have occurred when color mixing was observed while being determined not to have occurred when color mixing was not observed. Evaluation criteria are indicated below.

(Evaluation Criteria of Bleeding Inhibition)
A (Good): bleeding has not occurred
B (Poor): bleeding has occurred When a dry film is formed on the surface of the liquid droplet of the cyan ink within 22 seconds from the cyan ink is dropped and landed, no bleeding, and thus no color mixing, occurs. Therefore, when the result of the evaluation was graded as A (when bleeding has not occurred), it was determined that a dry film has not been formed on the surface of the liquid droplet of the cyan ink within 22 seconds from the dropping and the landing of the cyan ink. That is, when the result of the evaluation of bleeding inhibition was rated as A, it was determined that the dry film formation time of the cyan ink was within 22 seconds.

Note that the terms in Tables 1 and 2 are as follows.
Water: ion exchange water
Rest: amount that brings the total mass of components contained in a corresponding ink to 100.00% by mass. For example, the amount of ion exchange water contained in the ink (A-1) is 63.34% by mass (=100.00−(3.00+3.00+0.06+18.00+12.00+0.40+0.20))
Resin: emulsion ("SUPERFLEX 870", product of DKS Co. Ltd., nonvolatile component content: 30% by mass, dispersion medium: water) of urethane resin being a water-insoluble resin
CMC1330: sodium carboxymethylcellulose ("CMC DAICEL 1330", product of Daicel Miraizu Ltd., degree of etherification: 1.3, 1%-viscosity: 75 mPa·s)
CMC1240: sodium carboxymethylcellulose ("CMC DAICEL 1240", product of Daicel Miraizu Ltd., degree of etherification: 0.9, 1%-viscosity: 35 mPa·s)
CMC1220: sodium carboxymethylcellulose ("CMC DAICEL 1220", product of Daicel Miraizu Ltd., degree of etherification: 0.9, 1%-viscosity: 15 mPa·s)
HEC: hydroxyethyl cellulose ("HEC DAICEL SP400", product of Daicel Miraizu Ltd., 2%-viscosity: 105 mPa·s)
GLYLOID: tamarind seed gum (GLYLOID (registered Japanese trademark) 3S", product of DSP GOKYO FOOD & CHEMICAL Co., Ltd.)
PG: propylene glycol
DPGME: dipropylene glycol monomethyl ether
BTG: triethylene glycol monobutyl ether
Surfactant a: acrylic surfactant ("POLYFLOW (registered Japanese trademark) KL-870", product of Kyoeisha Chemical Co., Ltd., effective components: 35±5% by mass of acrylic polymer and 55±5% by mass of amphipathic oligomer, solvent: 7% by mass of water)
Surfactant b: silicone surfactant ("SILFACE (registered Japanese trademark) SAG503A", product of Nissin Chemical Industry Co., Ltd., polarity: nonionic, effective component: polyether-modified silicone, effective component concentration: 100% by mass)
GE percentage content: percentage content (unit: % by mass) of glycol ether to total mass of first water-soluble organic solvent (glycol ether) and second water-soluble organic solvent
-: no containment of corresponding component
Recording medium: non-absorbent recording medium used in measurement and evaluation
OPP: byaxially oriented polypropylene (OPP) film ("TORAYFAN (registered Japanese trademark) BO", product of Toray Industries, Inc.)
PET: PET film ("LUMIRROR (registered Japanese trademark) #150-T60, product of Toray Industries, Inc., polyester film)

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| | Ink | | A-1 | A-2 | A-3 | A-4 | A-5 | A-6 | A-7 | A-8 | A-9 | A-10 |
| Composition (% by mass) | Water | | Rest | Rest | Rest | Rest | Rest | Rest | Rest | Rest | Rest | Rest |
| | Pigment dispersion | | 20.00 | 20.00 | 20.00 | 20.00 | 20.00 | 20.00 | 20.00 | 20.00 | 20.00 | 20.00 |
| | Resin | | 3.00 | 3.00 | 3.00 | 3.00 | 3.00 | 3.00 | 3.00 | 3.00 | 3.00 | 3.00 |
| | Polysaccharide | CMC1330 | 0.06 | 0.03 | 0.07 | 0.06 | 0.06 | 0.06 | — | — | — | — |
| | | CMC1240 | — | — | — | — | — | — | 0.09 | 0.05 | — | — |
| | | CMC1220 | — | — | — | — | — | — | — | — | 0.11 | 0.60 |
| | | HEC | — | — | — | — | — | — | — | — | — | — |
| | | GLYLOID | — | — | — | — | — | — | — | — | — | — |
| | Second water-soluble organic solvent | PG | 18.00 | 18.00 | 18.00 | 18.00 | 18.00 | 18.00 | 18.00 | 18.00 | 18.00 | 18.00 |
| | First water-soluble organic solvent | DPGME | 12.00 | 12.00 | 12.00 | 18.00 | — | — | 12.00 | 12.00 | 12.00 | 12.00 |
| | | BTG | — | — | — | — | 12.00 | 18.00 | — | — | — | — |
| | Surfactant a | | 0.40 | 0.40 | 0.40 | 0.40 | 0.40 | 0.40 | 0.40 | 0.40 | 0.40 | 0.40 |
| | Surfactant b | | 0.20 | 0.20 | 0.20 | 0.20 | 0.20 | 0.20 | 0.20 | 0.20 | 0.20 | 0.20 |
| | Total | | 100.00 | 100.00 | 100.00 | 100.00 | 100.00 | 100.00 | 100.00 | 100.00 | 100.00 | 100.00 |
| GE percentage content (% by mass) | | | 40 | 40 | 40 | 50 | 40 | 50 | 40 | 40 | 40 | 40 |
| ΔV (%) | | | 32 | 25 | 44 | 32 | 32 | 32 | 32 | 25 | 32 | 25 |
| Recording medium | | | OPP | PET | PET | OPP | OPP | OPP | OPP | OPP | OPP | OPP |
| Evaluation | Agglomeration inhibition | | A | A | A | A | A | A | A | A | A | A |
| | Bleeding inhibition | | A | A | A | A | A | A | A | A | A | A |

TABLE 2

| | | | Comparative example | | | | | | |
|---|---|---|---|---|---|---|---|---|---|
| | | | 1 | 2 | 3 | 4 | 5 | 6 | 7 |
| | | Ink | B-1 | B-2 | B-3 | B-4 | B-5 | B-6 | B-7 |
| Composition (% by mass) | | Water | Rest | Rest | Rest | Rest | Rest | Rest | Rest |
| | | Pigment dispersion | 20.00 | 20.00 | 20.00 | 20.00 | 20.00 | 20.00 | 20.00 |
| | | Resin | 3.00 | 3.00 | 3.00 | 3.00 | 3.00 | 3.00 | 3.00 |
| | Polysaccharide | CMC1330 | — | 0.08 | — | 0.08 | — | — | 0.06 |
| | | CMC1240 | — | — | — | — | — | — | — |
| | | CMC1220 | — | — | — | — | — | — | — |
| | | HEC | — | — | — | — | 0.41 | — | — |
| | | GLYLOID | — | — | — | — | — | 0.32 | — |
| | Second water-soluble organic solvent | PG | 18.00 | 18.00 | 18.00 | 18.00 | 18.00 | 18.00 | 18.00 |
| | First water-soluble organic solvent | DPGME | 12.00 | 12.00 | 12.00 | 12.00 | 12.00 | 12.00 | 12.00 |
| | | BTG | — | — | — | — | — | — | — |
| | | Surfactant a | 0.40 | 0.40 | 0.40 | 0.40 | 0.40 | 0.40 | 0.40 |
| | | Surfactant b | 0.20 | 0.20 | 0.20 | 0.20 | 0.20 | 0.20 | — |
| | | Total | 100.00 | 100.00 | 100.00 | 100.00 | 100.00 | 100.00 | 100.00 |
| | GE percentage content (% by mass) | | 40 | 40 | 40 | 40 | 40 | 40 | 40 |
| | ΔV (%) | | 12 | 46 | 19 | 48 | 46 | 46 | 18 |
| | Recording medium | | OPP | OPP | PET | PET | OPP | OPP | OPP |
| Evaluation | Agglomeration inhibition | | A | B | A | B | B | B | A |
| | Bleeding inhibition | | B | A | B | A | A | A | B |

As shown in Table 2, each volume reduction rate ΔV of the inks (B-1), (B-3), and (B-7) was less than 25%. Bleeding inhibition was evaluated as poor for these inks.

As shown in Table 2, each volume reduction rate ΔV of the inks (B-2), (B-4), (B-5), and (B-6) was greater than 45%. Agglomeration inhibition was evaluated as poor for these inks.

By contrast, each volume reduction rate ΔV of the inks (A-1) to (A-10) was at least 25% and no greater than 45%. Both agglomeration inhibition and bleeding inhibition were evaluated as good for these inks.

From the above, the ink according to the present disclosure that encompasses the inks (A-1) to (A-10) hardly bleeds in each non-absorbent recording medium and the ink components thereof hardly agglomerate on the non-absorbent recording medium. Therefore, it can be determined that occurrence of bleeding and irregularity in a formed image can be inhibited in image formation on the non-absorbent recording medium using the ink according to the present disclosure. It can be also determined that the inkjet recording method according to the present disclosure, which uses such an ink, can inhibit occurrence of bleeding and irregularity in a formed image in image formation on the non-absorbent recording medium.

What is claimed is:

1. An inkjet ink that has
a volume reduction rate ΔV calculated using formula (1) of at least 25% and no greater than 45%:

$$\Delta V = 100 \times (V_0 - V_{22})/V_0 \quad (1)$$

where in the formula (1), $V_0$ represents a first volume of a liquid droplet of the inkjet ink at landing, on a non-absorbent recording medium, of the inkjet ink dropped onto the non-absorbent recording medium, and $V_{22}$ represents a second volume of the liquid droplet when 22 seconds elapse from the landing of the liquid droplet on the non-absorbent recording medium, and
the volume reduction rate ΔV of the ink is measured in a sealed environment with no wind at a temperature of 25° C. and a relative humidity of 50% under an air pressure (760 mmHg) using a contact angle measuring device equipped with a syringe.

2. The inkjet ink according to claim 1, comprising:
a pigment;
a cellulose derivative;
a first water-soluble organic solvent;
a second water-soluble organic solvent; and
water, wherein
the first water-soluble organic solvent is glycol ether,
the second water-soluble organic solvent is a water-soluble organic solvent that is not glycol ether,
the cellulose derivative has a percentage content of at least 0.01% by mass and no greater than 0.20% by mass to a mass of the inkjet ink,
the glycol ether has a percentage content of at least 12% by mass and no greater than 18% by mass to the mass of the inkjet ink,
the glycol ether has a percentage content of at least 40% by mass and no greater than 50% by mass to a total mass of the first water-soluble organic solvent and the second water-soluble organic solvent, and
the inkjet ink further comprises a water-insoluble resin.

3. The inkjet ink according to claim 2, wherein
the percentage content of the cellulose derivative is at least 0.01% by mass and no greater than 0.07% by mass to the mass of the inkjet ink, and
the inkjet ink further comprises both an acrylic surfactant and a silicone surfactant.

4. The inkjet ink according to claim 2, wherein
the water-insoluble resin is urethane resin.

5. The inkjet ink according to claim 2, wherein
the cellulose derivative is sodium salt of carboxymethyl cellulose.

6. The inkjet ink according to claim 2, wherein
the glycol ether is dipropylene glycol monomethyl ether or triethylene glycol monobutyl ether.

7. The inkjet ink according to claim 2, wherein
the second water-soluble organic solvent is propylene glycol.

8. The inkjet ink according to claim 1, wherein
a dry film formation time is within 22 seconds, the dry film formation time being a time from the landing of the liquid droplet of the inkjet ink on the non-absorbent recording medium to formation of a dry film on a surface of the liquid droplet of the inkjet ink, and
the dry film formation time of the inkjet ink on the surface of the liquid droplet is measured using a contact angle measuring device equipped with a syringe in an environment at a temperature of 25° C. and a relative humidity of 50%.

9. An inkjet recording method comprising
ejecting an inkjet ink toward a non-absorbent recording medium, wherein
the inkjet ink has a volume reduction rate $\Delta V$ calculated using formula (1) of at least 25% and no greater than 45%:

$$\Delta V = 100 \times (V_0 - V_{22})/V_0 \quad (1)$$

where in the formula (1), $V_0$ represents a first volume of a liquid droplet of the inkjet ink at landing, on the non-absorbent recording medium, of the inkjet ink dropped onto the non-absorbent recording medium, and $V_{22}$ represents a second volume of the liquid droplet when 22 seconds elapse from the landing of the liquid droplet on the non-absorbent recording medium, and the volume reduction rate $\Delta V$ of the ink is measured in a sealed environment with no wind at a temperature of 25° C. and a relative humidity of 50% under an air pressure (760 mmHg) using a contact angle measuring device equipped with a syringe.

10. The inkjet recording method according to claim 9, wherein
the non-absorbent recording medium is a polyethylene terephthalate substrate or a polypropylene substrate.

* * * * *